(12) United States Patent
Buchholz et al.

(10) Patent No.: US 11,760,678 B2
(45) Date of Patent: Sep. 19, 2023

(54) APPARATUS AND METHOD FOR CONTROLLING AN OXYGEN CONTAINING ATMOSPHERE IN A GLASS MANUFACTURING PROCESS

(71) Applicant: CORNING INCORPORATED, Corning, NY (US)

(72) Inventors: Michael James Buchholz, Corning, NY (US); Megan Aurora DeLamielleure, Corning, NY (US); George Kristian Schwenke, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 147 days.

(21) Appl. No.: 17/048,852

(22) PCT Filed: Apr. 15, 2019

(86) PCT No.: PCT/US2019/027508
§ 371 (c)(1),
(2) Date: Oct. 19, 2020

(87) PCT Pub. No.: WO2019/204217
PCT Pub. Date: Oct. 24, 2019

(65) Prior Publication Data
US 2021/0253465 A1 Aug. 19, 2021

Related U.S. Application Data (60) Provisional application No. 62/660,323, filed on Apr. 20, 2018.

(51) Int. Cl.
*C03B 5/225* (2006.01)
*C03B 5/167* (2006.01)
*C03B 7/00* (2006.01)

(52) U.S. Cl.
CPC ............ *C03B 5/225* (2013.01); *C03B 5/1675* (2013.01); *C03B 7/005* (2013.01)

(58) Field of Classification Search
CPC .. C03B 5/225; C03B 7/02; C03B 7/00; C03B 17/064; C03B 5/16; C03B 5/00
See application file for complete search history.

(56) References Cited

U.S. PATENT DOCUMENTS 3,337,322 A * 8/1967 Taylor ..................... C03B 18/20
65/182.3
3,630,701 A * 12/1971 Javaux .................... C03B 18/22
65/168

(Continued)

FOREIGN PATENT DOCUMENTS

AU 199642728 A 7/1996
CN 101326129 A 12/2008

(Continued)

OTHER PUBLICATIONS

Cullis et al, ("The mechanism of the hydrogen-oxygen reaction; IV. The activation energy of the initiating process", Sep. 24, 1946, Proceedings of the Royal Society, 186: 462-469 (Year: 1946).*

(Continued)

*Primary Examiner* — Galen H Hauth
*Assistant Examiner* — Steven S Lee
(74) *Attorney, Agent, or Firm* — Kevin M. Able (57) ABSTRACT

Methods for reducing the oxygen concentration in an enclosure including a platinum-containing vessel through which molten glass is flowing are disclosed. The methods include injecting hydrogen gas into an oxygen-containing atmosphere flowing between the enclosure and a reaction chamber. The atmosphere is heated with a heating element in the reaction chamber, whereupon oxygen in the oxygen-containing atmosphere reacts with the hydrogen. In other embodiments, the hydrogen gas and oxygen-containing (Continued)

atmosphere can be exposed to a catalyst comprising platinum positioned in the reaction chamber.

25 Claims, 2 Drawing Sheets

(56) References Cited

U.S. PATENT DOCUMENTS

| | | | | |
|---|---|---|---|---|
| 5,785,726 | A * | 7/1998 | Dorfeld | C03C 3/091 65/157 |
| 6,854,290 | B2 * | 2/2005 | Hayes | C03B 5/2252 65/135.1 |
| 6,993,936 | B2 * | 2/2006 | Grzesik | C03B 5/163 65/195 |
| 7,628,039 | B2 | 12/2009 | Deangelis et al. | |
| 8,127,572 | B2 * | 3/2012 | Dorfeld | C03B 5/163 65/29.12 |
| 9,073,771 | B2 * | 7/2015 | Goller | B01D 19/0031 |
| 9,475,720 | B2 * | 10/2016 | Lineman | C03B 5/1875 |
| 2001/0039812 | A1 * | 11/2001 | Romer | C03B 5/225 65/135.1 |
| 2005/0000248 | A1 * | 1/2005 | Lauten-Schlaeger | C03C 3/091 65/60.1 |
| 2005/0050923 | A1 * | 3/2005 | Grzesik | C03B 5/425 65/374.11 |
| 2005/0217317 | A1 * | 10/2005 | Lautenschlaeger | C03B 5/1675 65/29.13 |
| 2006/0242996 | A1 * | 11/2006 | DeAngelis | C03B 5/163 65/134.1 |
| 2007/0149380 | A1 * | 6/2007 | Dorfeld | C03B 5/225 501/55 |
| 2008/0057275 | A1 * | 3/2008 | Grzesik | C03B 5/43 428/688 |
| 2008/0282734 | A1 * | 11/2008 | Kolberg | C03B 5/26 65/327 |
| 2009/0126405 | A1 | 5/2009 | DeAngelis et al. | |
| 2009/0165500 | A1 * | 7/2009 | Luebbers | C03B 5/43 65/157 |
| 2009/0241602 | A1 * | 10/2009 | DeAngelis | C03B 5/163 65/157 |
| 2012/0125050 | A1 * | 5/2012 | Murakami | C03B 5/225 65/90 |
| 2012/0125051 | A1 | 5/2012 | Bergman et al. | |
| 2013/0333420 | A1 * | 12/2013 | Goller | C03B 5/1675 65/135.1 |
| 2014/0024517 | A1 * | 1/2014 | Hayashi | C03B 18/20 65/99.2 |
| 2014/0090419 | A1 * | 4/2014 | Charbonneau | C03B 5/193 65/135.1 |
| 2016/0214881 | A1 * | 7/2016 | Mikami | C03C 3/16 |
| 2017/0341965 | A1 * | 11/2017 | Claussen | C03B 5/43 |

FOREIGN PATENT DOCUMENTS

| | | | | |
|---|---|---|---|---|
| CN | 103118993 | A | | 5/2013 |
| CN | 108069579 | A * | | 5/2018 |
| CN | 207944013 | U * | | 10/2018 |
| DE | 102009057241 | A1 * | 6/2011 | ............ C03B 5/02 |
| DE | 102009057241 | A1 * | 6/2011 | ............ C03B 5/02 |
| DE | 102016112081 | A1 | | 1/2018 |
| DE | 102016112081 | A1 * | 1/2018 | ............ C03B 5/16 |
| EP | 0395221 | A1 * | 10/1990 | ............ C03B 18/20 |
| EP | 0395221 | A1 | | 10/1990 |
| IN | 201644010465 | | | 8/2017 |
| JP | 2001-503008 | A | | 3/2001 |
| JP | 2008-539160 | A | | 11/2008 |
| JP | 2009035466 | A * | 2/2009 | ........... C03B 17/064 |
| JP | 2009-518278 | A | | 5/2009 |
| JP | 2013-006765 | A | | 1/2013 |
| JP | 2013-116852 | A | | 6/2013 |
| JP | 2015129085 | A * | 7/2015 | ........... C03B 17/064 |
| JP | 2017-162676 | A | | 9/2017 |
| TW | 201708129 | A | | 3/2017 |
| WO | WO-2005110933 | A1 * | 11/2005 | ............ C03B 5/193 |
| WO | WO-2014125954 | A1 * | 8/2014 | ............ C03B 18/20 |
| WO | WO-2016053773 | A1 * | 4/2016 | ........... C03B 17/064 |
| WO | 2016/200788 | A2 | | 12/2016 |
| WO | WO-2016200788 | A2 * | 12/2016 | ........... C03B 17/064 |

OTHER PUBLICATIONS

Michaelides et al, "Catalytic Water Formation on Platinum: A First-Principles Study", 2001, J. Am. Chem. Soc. 123:4235-4242 (Year: 2001).*

Baumgarten et al; "Indirect Catalysis, Caused By Hydrogen Spillover Through the Gas Phase, Activation By Hydrogen Oxygen Reaction"; React. Kinect. Catal. Letter. vol. 71., No. 2, 2000, pp. 335-341.

International Search Report and Written Opinion of the International Searching Authority; PCT/US2019/027508; dated Jul. 11, 2019, 12 pages; European Patent Office.

Ree et al., "Dynamics of gas-surface interactions: Reaction of atomic oxygen with chemisorbed hydrogen on tungsten", Journal of Physical Chemistry A, 1997, pp. 4523-4534.

Wojnowski et al; "Influence of Diluting Gases On the Oxygen-Hydrogen Reaction On A Pt-Rh Catalyst"; Reaction Kinetics and Catalysis Letters, vol. 4, No. 4, 1976, pp. 443-449.

Taiwanese Patent Application No. 108113499, Office Action, dated Oct. 17, 2022, 2 page; Taiwanese Patent Office.

Japanese Patent Application No. 2020-556779, Office Action, dated Mar. 22, 2022, 4 pages (2 pages of English Translation and 2 pages of Original Copy); Japanese Patent Office.

* cited by examiner

APPARATUS AND METHOD FOR CONTROLLING AN OXYGEN CONTAINING ATMOSPHERE IN A GLASS MANUFACTURING PROCESS

CROSS-REFERENCE TO RELATED APPLICATIONS

This application is a national stage application under 35 U.S.C. § 371 of International Application No. PCT/US2019/027508, filed on Apr. 15, 2019, which claims the benefit of priority of U.S. Provisional Application Ser. No. 62/660,323 filed on Apr. 20, 2018 the contents of which are relied upon and incorporated herein by reference in their entirety as if fully set forth below.

BACKGROUND

Field

The present disclosure relates to the manufacture of glass, and in particular the control of oxygen in an atmosphere surrounding platinum-containing vessels comprising the glass manufacturing apparatus.

Technical Background

Hydrogen is known to cross a platinum boundary. An imbalance in hydrogen across the platinum boundary will cause the hydrogen to permeate the platinum boundary in a direction toward the lowest hydrogen partial pressure.

The manufacture of optical quality glass articles, for example glass sheets used in the manufacture of display panels, typically comprises flowing molten glass through platinum or platinum alloy vessels. Water contained in the molten glass flowing into the vessels represents a generally stable partial pressure of hydrogen. If the partial pressure of hydrogen on the external surfaces of the platinum-containing vessels is lower than the partial pressure of hydrogen in the molten glass, hydrogen contained in the molten glass resulting from the breakdown of the water will permeate through the platinum vessels into the external atmosphere. The oxygen left behind in the molten glass can form bubbles at the molten glass-platinum interface, and these bubbles can be released into the molten glass, producing undesirable defects (blisters) in the finished glass articles.

To mitigate hydrogen permeation, the platinum-containing vessels are typically positioned within an enclosure with a controlled atmosphere. The enclosure atmosphere is circulated through the enclosure and a predetermined partial pressure of hydrogen in the enclosure atmosphere is maintained, typically by injecting water vapor into the enclosure atmosphere. The enclosure atmosphere comprises a reduced oxygen content to prevent corrosion (e.g., oxidation) of the vessel that can lead to vessel failure. Blowers circulate the atmosphere to cool the platinum-containing vessel.

While blowers can be effective to prevent excessive heating of the platinum-containing vessels, these blowers can also create low pressure regions in the system that cause an infiltration of ambient air, since it is difficult to make the system gas tight. To reduce the oxygen content of the atmosphere as much as possible, nitrogen ($N_2$) can be injected to dilute the oxygen. Still, there are practical limits to how low the oxygen content can be driven because enclosure leakage is difficult to avoid, and high pressure in the melting delivery system via nitrogen gas addition can cause platinum particulate defects on free surfaces of the platinum that can then make their way to the molten glass.

An alternative to this solution is a non-circulating system that does not use a fan. However, a non-circulating system would limit the amount of cooling that can be achieved in the cooling zones of the process. Increasing the flow rate of molten glass, for example to increase production, increases the temperature of the conveyance system and requires more cooling to meet a target temperature (e.g., viscosity) for the molten glass. Accordingly, heating power to the system can be reduced to promote cooling. However, in the extreme, the flow of molten glass could be increased to a rate for which the heating power is reduced to zero, resulting in the loss of heating as a control parameter. Heating as a control parameter can be regained by increasing gas flow through the system to promote additional cooling. The increased gas flow (boosted by the fan speed) increases the power needed to hold the same temperature target. Therefore, in practice, a non-zero minimum heating power is needed for the cooling zones. Any additional heating power above the minimum becomes available to further increase the glass flow through the system. Thus, a combination of heating and cooling are used in the cooling zones as "brakes" in the process (i.e. to slow or stop glass flow as needed). Reserve or additional heating power above the minimum power can be used to enable flow increases, which can translate to increased production. Therefore, although lower oxygen content could theoretically be achieved by lowering fan speed, there is a real cost to this alternative which is not financially attractive.

Another alternative is to burn the excess oxygen using a combustion burner. This method could significantly lower oxygen content, but would impose additional complications. One such complication is managing the reaction to burn off $O_2$ and dealing with heat and flame length of a burner. Keeping the oxygen content constant is utilized to maintain the effective dew-point of the gas and combustion could provide more variability in $O_2$ content. Another complication is that the resultant combustion gases circulate around the platinum-containing vessels. Therefore, both the fuel and combustion products should be compatible with the platinum-containing vessels, and the molten glass within, without creating defects in the glass or degrading the metal. For example, in the case of carbon-based fuels permeation of carbon through the platinum system can create blister defects. Therefore, undesirable reactions and active management of the flame make this alternative possible but not attractive.

Other methods of removing oxygen can employ chemical adsorption. However, again, this method is impractical because it would add additional chemicals to the environment, requires maintenance, and increases operating cost.

SUMMARY

In accordance with the present disclosure, a method of reducing an oxygen concentration in a glass manufacturing apparatus is disclosed, comprising flowing molten glass through a platinum-containing vessel, the platinum-containing vessel positioned within an enclosure, flowing an atmosphere comprising oxygen between the enclosure and the platinum-containing vessel, directing the atmosphere through a reaction chamber in fluid communication with the enclosure, injecting a reaction gas comprising hydrogen gas into the enclosure atmosphere, and reacting the hydrogen gas with the oxygen in the reaction chamber.

A concentration of the hydrogen gas in the reaction gas can be in a range from about 1% to 100% by volume relative to a total volume of the reaction gas. In some embodiments, the reaction gas can comprise an inert gas, for example nitrogen or a noble gas.

According to various embodiments, the atmosphere can flow between the enclosure and the reaction chamber along a circulation path, and the reaction gas can be injected into the circulation path upstream of the reaction chamber, for example into piping upstream of the reaction chamber and connecting the reaction chamber to the capsule.

The method can further comprise sensing a concentration of oxygen in the circulation path upstream of the reaction chamber, wherein the oxygen concentration in the circulation path upstream of the reaction chamber is equal to or greater than about 0.5% by volume.

The method can still further comprise sensing a concentration of oxygen in the circulation path downstream of the reaction chamber. In some embodiments, the oxygen concentration in the circulation path downstream of the reaction chamber can be less than about 0.2% by volume, for example less than about 0.1%, less than 0.05%, or even less than about 0.01%.

In some embodiments, the controller can increase or decrease a flow rate of hydrogen gas in response to the sensed downstream oxygen concentration. The method may further comprise controlling a concentration of the oxygen in the atmosphere downstream of the reaction chamber to a predetermined value by injecting additional oxygen into the reaction chamber during the reacting.

A pressure of the atmosphere in the enclosure can be less than about 38 Pa.

In further embodiments, the method can comprise heating the atmosphere in the reaction chamber. For example, the heating can comprise heating the atmosphere with a heating element, such as an electric heating element. A temperature of the heating element during the heating can be at least 500° C. In some embodiments, the heating element can comprise platinum.

In still further embodiments, the method can comprise exposing the atmosphere and the reaction gas to a platinum-containing catalyst in the reaction chamber. For example, in certain embodiments, the heating element can comprise platinum, wherein the heating element functions as a catalyst.

In other embodiments, a method of reducing an oxygen concentration in a glass manufacturing apparatus is described, comprising flowing molten glass through a platinum-containing vessel, the platinum-containing vessel positioned within an enclosure containing an atmosphere comprising oxygen flowing between the enclosure and the platinum-containing vessel, directing the atmosphere through a reaction chamber in fluid communication with the enclosure through piping upstream of the reaction chamber and piping downstream of the reaction chamber, wherein the enclosure, the upstream piping, the reaction chamber and the downstream piping comprise a circulation path. The method can further include injecting hydrogen gas into the circulation path upstream of the reaction chamber and reacting the hydrogen gas with the oxygen in the reaction chamber.

The method can further comprise heating the capsule atmosphere and the hydrogen gas in the reaction chamber, for example with a heating element, for example an electric heating element.

A temperature of the heating element during the heating can be at least about 500° C.

In some embodiments, the heating element can comprise platinum.

In some embodiments, the injecting may further comprise injecting an inert gas with the hydrogen gas.

In another embodiments, an apparatus for controlling an oxygen containing atmosphere in a glass manufacturing process is disclosed, comprising a platinum-containing vessel configured to convey a molten material therethrough, an enclosure containing the platinum-containing vessel, an environmental control system in fluid communication with the enclosure and configured to circulate an atmosphere through the enclosure, the environmental control system comprising: a reaction chamber, a gas injection valve in fluid communication with a reservoir of hydrogen gas and configured to provide the hydrogen gas to the environmental control system upstream of the reaction chamber relative to a flow direction of the atmosphere; and a platinum-comprising catalyst positioned in the reaction chamber.

The apparatus may further comprise a heating element positioned within the reaction chamber. In some embodiments, the heating element can comprise platinum and function as a catalyst. For example, the heating element can be an electric heating element.

In some embodiments, the environmental control system may further comprise an injection valve in fluid communication with a reservoir of an oxygen-comprising gas and configured to provide oxygen-comprising gas to the reaction chamber.

Additional features and advantages of the embodiments disclosed herein will be set forth in the detailed description that follows, and in part will be apparent to those skilled in the art from that description or recognized by practicing the invention as described herein, including the detailed description which follows, the claims, as well as the appended drawings.

It is to be understood that both the foregoing general description and the following detailed description present embodiments intended to provide an overview or framework for understanding the nature and character of the embodiments disclosed herein. The accompanying drawings are included to provide further understanding, and are incorporated into and constitute a part of this specification. The drawings illustrate various embodiments of the disclosure and together with the description explain the principles and operations thereof.

DETAILED DESCRIPTION

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value to the other particular value. Similarly, when values are expressed as approximations by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

As used herein, the term "vessel" shall be construed to encompass any structure configured to hold, contain, or convey therethrough, a molten glass, and includes without limitation, conditioning vessels, melting vessels, and conduits that convey molten glass from one location to another location.

As used herein, the term "molten glass" means a molten material that, when appropriately thermally conditioned (e.g., by cooling) can assume a glassy state, and is synonymous with "glass melt" or simply "melt."

Figure 1:
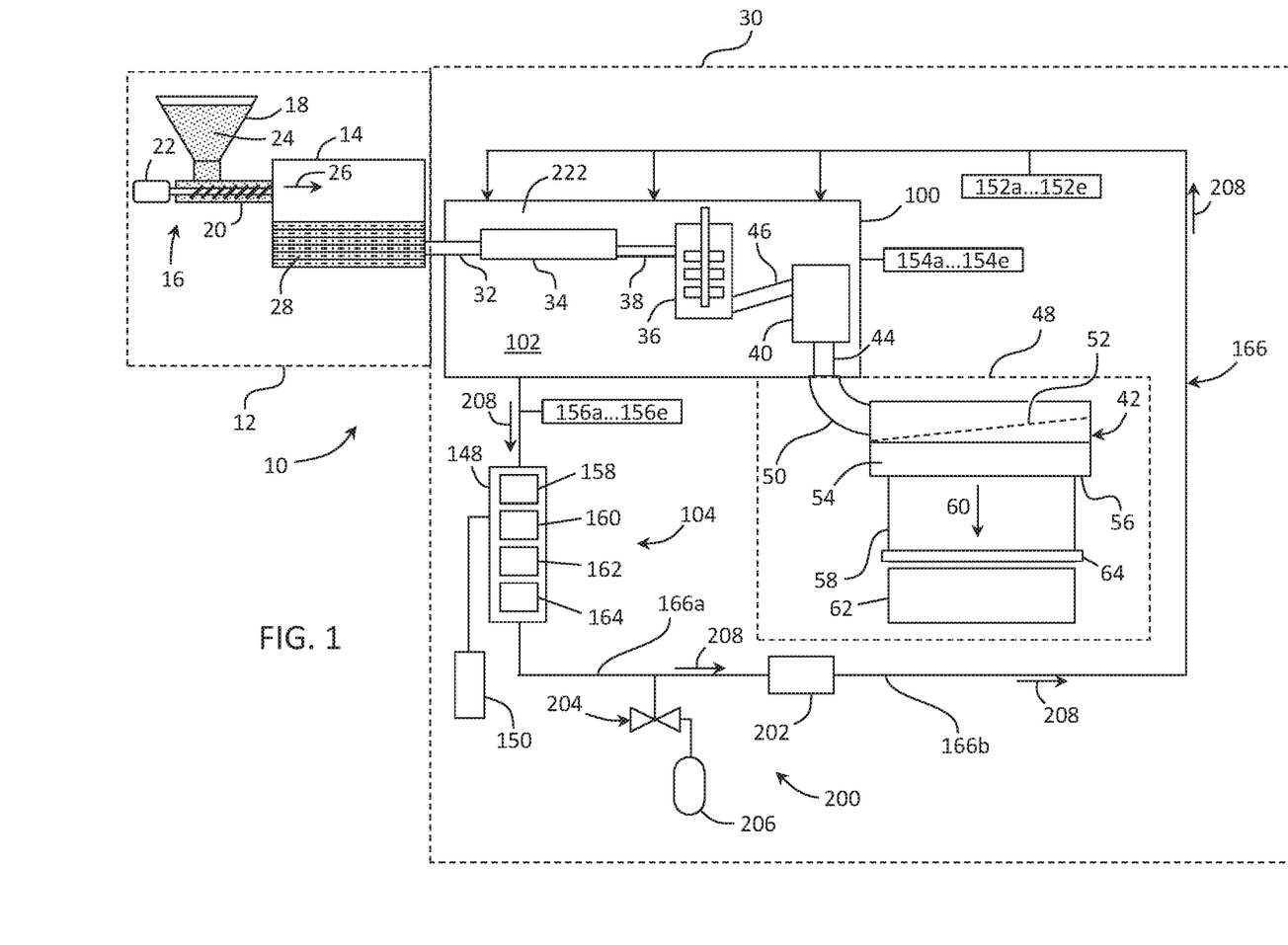
FIG. 1 is a schematic view of an exemplary glass making apparatus including a reaction chamber for eliminating oxygen from an enclosure containing one or more platinum-containing vessels.

Shown in FIG. 1 is an exemplary glass manufacturing apparatus 10. In some embodiments, the glass manufacturing apparatus 10 can comprise a glass melting furnace 12 that can include a melting vessel 14. In addition to melting vessel 14, glass melting furnace 12 can optionally include one or more additional components such as heating elements (e.g., combustion burners and/or electrodes) configured to heat raw material and convert the raw material into molten glass. For example, melting vessel 14 may be an electrically-boosted melting vessel, wherein energy is added to the raw material through both combustion burners and by direct heating (wherein an electric current is established through the raw material to heat the raw material via Joule heating).

In further embodiments, glass melting furnace 12 may include thermal management devices (e.g., insulation components) that reduce heat loss from the melting vessel. In still further embodiments, glass melting furnace 12 may include electronic devices and/or electromechanical devices that facilitate melting of the raw material into a glass melt. Still further, glass melting furnace 12 may include support structures (e.g., support chassis, support member, etc.) or other components.

Melting vessel 14 is typically formed from a refractory material, such as a refractory ceramic material, for example a refractory ceramic material comprising alumina or zirconia, although the refractory ceramic material may comprise other refractory materials, such as yttrium (e.g., yttria, yttria stabilized zirconia, yttrium phosphate), zircon ($ZrSiO_4$) or alumina-zirconia-silica or even chrome oxide, used either alternatively or in any combination. In some examples, melting vessel 14 may be constructed from refractory ceramic bricks.

In some embodiments, glass melting furnace 12 may be incorporated as a component of a glass manufacturing apparatus configured to fabricate a glass article, for example glass ribbon of various lengths, although in further embodiments, the glass manufacturing apparatus may be configured to form other glass articles without limitation, such as glass rods, glass tubes, glass envelopes (for example, glass envelopes for lighting devices, e.g., light bulbs) and glass lenses, although many other glass articles are contemplated. In some examples, the melting furnace may be incorporated as a component of a glass manufacturing apparatus comprising a slot draw apparatus, a float bath apparatus, a down draw apparatus (e.g., a fusion down draw apparatus), an up draw apparatus, a pressing apparatus, a rolling apparatus, a tube drawing apparatus or any other glass manufacturing apparatus that would benefit from the present disclosure. By way of example, FIG. 1 schematically illustrates glass melting furnace 12 as a component of a fusion down draw glass manufacturing apparatus 10 for fusion drawing a glass ribbon for subsequent processing into individual glass sheets or rolling the glass ribbon onto a spool.

Glass manufacturing apparatus 10 (e.g., fusion down draw apparatus 10) can optionally include an upstream glass manufacturing apparatus 16 positioned upstream relative to glass melting vessel 14. In some examples, a portion of, or the entire upstream glass manufacturing apparatus 16, may be incorporated as part of the glass melting furnace 12.

As shown in the embodiment illustrated in FIG. 1, the upstream glass manufacturing apparatus 16 can include a raw material storage bin 18, a raw material delivery device 20 and a motor 22 connected to the raw material delivery device. Raw material storage bin 18 may be configured to store a quantity of raw material 24 that can be fed into melting vessel 14 of glass melting furnace 12 through one or more feed ports, as indicated by arrow 26. Raw material 24 typically comprises one or more glass forming metal oxides and one or more modifying agents. In some examples, raw material delivery device 20 can be powered by motor 22 such that raw material delivery device 20 delivers a predetermined amount of raw material 24 from the storage bin 18 to melting vessel 14. In further examples, motor 22 can power raw material delivery device 20 to introduce raw material 24 at a controlled rate based on a level of molten glass sensed downstream from melting vessel 14 relative to a flow direction of the molten glass. Raw material 24 within melting vessel 14 can thereafter be heated to form molten glass 28. Typically, in an initial melting step, raw material is added to the melting vessel as particulate, for example as comprising various "sands". Raw material may also include scrap glass (i.e. cullet) from previous melting and/or forming operations. Combustion burners are typically used to begin the melting process. In an electrically boosted melting process, once the electrical resistance of the raw material is sufficiently reduced (e.g., when the raw materials begin liquefying), electric boost is begun by developing an electric potential between electrodes positioned in contact with the raw materials, thereby establishing an electric current through the raw material, the raw material typically entering, or in, a molten state at this time.

Glass manufacturing apparatus 10 can also optionally include a downstream glass manufacturing apparatus 30 positioned downstream of glass melting furnace 12 relative to a flow direction of the molten glass 28. In some examples, a portion of downstream glass manufacturing apparatus 30 may be incorporated as part of glass melting furnace 12. However, in some instances, first connecting conduit 32 discussed below, or other portions of the downstream glass manufacturing apparatus 30, may be incorporated as part of the glass melting furnace 12. Elements of the downstream glass manufacturing apparatus, including first connecting conduit 32, may be formed from a precious metal. Suitable precious metals include platinum group metals selected from the group consisting of platinum, iridium, rhodium, osmium, ruthenium and palladium, or alloys thereof. For example, downstream components of the glass manufacturing apparatus may be formed from a platinum-rhodium alloy including from about 70% to about 90% by weight platinum and about 10% to about 30% by weight rhodium. However, other suitable metals for forming downstream components of the glass manufacturing apparatus can include molybdenum, rhenium, tantalum, titanium, tungsten and alloys thereof.

Downstream glass manufacturing apparatus 30 can include a fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may drive molten glass 28 through an interior pathway of first connecting conduit 32 from melting vessel 14 to fining vessel 34. It should be understood, however, that other conditioning vessels may be positioned downstream of melting vessel 14, for example between melting vessel 14 and fining vessel 34. In some embodiments, a conditioning vessel may be employed between the melting vessel and the fining vessel wherein molten glass from a primary melting vessel is further heated in a secondary vessel to continue the melting process, or cooled to a temperature lower than the temperature of the molten glass in the primary melting vessel before entering the fining vessel. Fining vessel 34 may be formed, for example, from a platinum-rhodium alloy including from about 70% to about 90% by weight platinum and about 10% to about 30% by weight rhodium.

As described previously, bubbles may be removed from molten glass 28 by various techniques. For example, raw material 24 may include multivalent compounds (i.e. fining agents) such as tin oxide that, when heated, undergo a chemical reduction reaction and release oxygen. Other suitable fining agents include without limitation arsenic, antimony, iron and cerium, although the use of arsenic and antimony may be discouraged for environmental reasons in some applications. Fining vessel 34 is heated to a temperature greater than the melting vessel temperature, thereby heating the fining agent. Oxygen bubbles produced by the temperature-induced chemical reduction of one or more fining agents included in the melt rise through the molten glass within the fining vessel, wherein gases in the molten glass produced in the melting furnace can coalesce or diffuse into the oxygen bubbles produced by the fining agent. The enlarged gas bubbles with increased buoyancy can then rise to a free surface of the molten glass within the fining vessel and thereafter be vented out of the fining vessel. The oxygen bubbles can further induce mechanical mixing of the molten glass in the fining vessel as they rise through the molten glass.

The downstream glass manufacturing apparatus 30 can further include another conditioning vessel, such as a mixing vessel 36, for example a stirring vessel, for mixing the molten glass that flows downstream from fining vessel 34. Mixing vessel 36 can be used to provide a homogenous glass melt composition, thereby reducing chemical or thermal inhomogeneities that may otherwise exist within the fined molten glass exiting the fining vessel. As shown, fining vessel 34 may be coupled to mixing vessel 36 by way of a second connecting conduit 38. In some embodiments, molten glass 28 may be gravity fed from the fining vessel 34 to mixing vessel 36 by way of second connecting conduit 38. For instance, gravity may drive molten glass 28 through an interior pathway of second connecting conduit 38 from fining vessel 34 to mixing vessel 36. Typically, the molten glass within mixing vessel 36 includes a free surface, with a free volume extending between the free surface and a top of the mixing apparatus. It should be noted that while mixing vessel 36 is shown downstream of fining vessel 34 relative to a flow direction of the molten glass, mixing vessel 36 may be positioned upstream from fining vessel 34 in other embodiments. Mixing vessel 36 may, in some embodiments, may be formed from a platinum-rhodium alloy including from about 70% to about 90% by weight platinum and about 10% to about 30% by weight rhodium.

In some embodiments, downstream glass manufacturing apparatus 30 may include multiple mixing vessels, for example a mixing vessel upstream from fining vessel 34 and a mixing vessel downstream from fining vessel 34. These multiple mixing vessels may be of the same design, or they may be of a different design from one another. In some embodiments, one or more of the vessels and/or conduits may include static mixing vanes positioned therein to promote mixing and subsequent homogenization of the molten material.

Downstream glass manufacturing apparatus 30 can further include delivery vessel 40 that may be located downstream from mixing vessel 36. Delivery vessel 40 may condition molten glass 28 to be fed into a downstream forming device. For instance, delivery vessel 40 can act as an accumulator and/or flow controller to adjust and provide a consistent flow of molten glass 28 to forming body 42 by way of exit conduit 44. The molten glass within delivery vessel 40 can, in some embodiments, include a free surface, wherein a free volume extends upward from the free surface to a top of the delivery vessel. As shown, mixing vessel 36 may be coupled to delivery vessel 40 by way of third connecting conduit 46. In some examples, molten glass 28 may be gravity fed from mixing vessel 36 to delivery vessel 40 by way of third connecting conduit 46. For instance, gravity may drive molten glass 28 through an interior pathway of third connecting conduit 46 from mixing vessel 36 to delivery vessel 40. Delivery vessel 40 may be formed, for example, from a platinum-rhodium alloy including from about 70% to about 90% by weight platinum and about 10% to about 30% by weight rhodium.

Downstream glass manufacturing apparatus 30 can further include forming apparatus 48 comprising the above-referenced forming body 42, including inlet conduit 50. Exit conduit 44 can be positioned to deliver molten glass 28 from delivery vessel 40 to inlet conduit 50 of forming apparatus 48. Inlet conduit 50 may, for example, be formed from a platinum-rhodium alloy including from about 70% to about 90% by weight platinum and about 10% to about 30% by weight rhodium.

Forming body 42 in a fusion down draw glass making apparatus can comprise a trough 52 positioned in an upper surface of the forming body and converging forming surfaces 54 (only one surface shown) that converge in a draw direction along a bottom edge (root) 56 of the forming body. Molten glass delivered to the forming body trough 52 via delivery vessel 40, exit conduit 44 and inlet conduit 50 overflows the walls of trough 52 and descends along the converging forming surfaces 54 as separate flows of molten glass. The separate flows of molten glass join below and along the root 56 to produce a single ribbon 58 of molten glass that is drawn along a draw plane 59 in a draw direction 60 from root 56 by applying a downward tension to the glass ribbon, such as by gravity, edge rolls and pulling roll assemblies, to control the dimensions of the glass ribbon as the molten glass cools and a viscosity of the material increases. Accordingly, glass ribbon 58 goes through a visco-elastic transition and acquires mechanical properties that give glass ribbon 58 stable dimensional characteristics. Glass ribbon 58 may in some embodiments be separated into individual glass sheets 62 by glass separation apparatus 64 in an elastic region of the glass ribbon, while in further embodiments, the glass ribbon may be wound onto spools and stored for further processing.

It should be apparent from the foregoing description that various components of downstream glass manufacturing apparatus 30 used to contain and/or convey molten glass from melting vessel 14 to forming body 42 can be formed from platinum or an alloy thereof. A phenomenon that plagues such platinum-containing molten glass conveyance and conditioning components is hydrogen permeation, a process by which hydrogen bonded to oxygen (e.g., hydroxyl ions, OH$^-$, generally termed "water") in the molten glass dissociates from the oxygen at high temperature and permeates through the platinum-containing walls of the various vessels through which the molten glass is flowing, leaving oxygen at the molten glass-wall boundary. The oxygen enters the molten glass flow as bubbles (blisters) of oxygen that become entrained in the molten glass and can be incorporated into final glass products produced by the forming apparatus, e.g., glass ribbons formed by forming body 42.

It should also be apparent that the rate of hydrogen permeation is a function of the respective hydrogen concentrations at the opposing surfaces of a platinum-containing vessel wall that forms the boundary between the molten glass and the atmosphere outside the platinum-containing vessel. As the hydrogen concentration outside the vessel increases, the tendency for hydrogen within the vessel (i.e., within the molten glass) to permeate through the vessel wall and out of the vessel decreases. However, while the water content of the molten glass remains largely stable during the manufacturing process, the moisture content of the atmosphere surrounding a glass manufacturing apparatus can fluctuate substantially, depending on humidity and temperature, making control of hydrogen permeation difficult.

To control and mitigate blister generation, modern glass manufacturing processes may further include a secondary enclosure, hereinafter "capsule", that encloses at least the platinum-containing components (e.g., vessels) of the downstream glass manufacturing apparatus. An atmosphere within the capsule can therefore be controlled to reduce the effects of hydrogen permeation by controlling the partial pressure of hydrogen in the capsule atmosphere. Several different types of these humidity controlled enclosures are discussed in U.S. Pat. Nos. 5,785,726 and 7,628,039.

In contrast to the manufacturing space (e.g., factory) in which the glass manufacturing apparatus may be contained, capsule 100 is a small enclosure comprising a small jacket volume 102 between the vessel and the capsule that facilitates better control of the atmosphere contained therein. For example, the capsule wall may be separated from the platinum-containing vessel wall by a meter or less. Thus, sensor readings for the capsule and associated equipment, such as relative humidity or dew point temperature for example, are more likely to be representative of conditions at the exterior metal surfaces of the glass processing equipment than for an entire factory because the jacket volume in capsule 100 is much smaller than the volume of the factory. Accordingly, control of blister generation can be exercised without the need to control the atmosphere in the larger environment within the room or manufacturing space in which the glass manufacturing apparatus is contained. For example, conditions necessary to control and mitigate hydrogen permeation are easier to induce in a small volume and, if imposed in a work space, would be uncomfortable or untenable to personnel within that space.

Jacket volume 102 is defined between the interior walls of capsule 100 and the exterior walls of one or more of vessels 32, 34, 36, 38, 40, 44 and 46 in downstream glass manufacturing apparatus 30. As shown, in some embodiments, capsule 100 can be arranged as one zone that encloses all or a portion of the length of the platinum-containing vessels of downstream glass manufacturing apparatus 30. Alternatively, although not shown, multiple capsules 100 can be constructed as multiple zones that enclose one or more of the vessels 32, 34, 36, 38, 40, 44 and 46. An advantage of utilizing multiple capsules 100 is the ability to control the atmosphere in one area of the downstream glass manufacturing apparatus independently of another area of the downstream glass manufacturing apparatus.

Also included in downstream glass manufacturing apparatus is a closed-loop control system 104 in fluid communication with capsule 100 that controls the atmosphere within capsule jacket volume 102 and prevents problematic oxidation reactions from occurring at the metal-glass interface inside any one or more of vessels 32, 34, 36, 38, 40, 44 and 46, or any other platinum-containing vessels through which molten glass flows and is contained within capsule 100. Closed-loop control system 104 controls the atmosphere inside capsule 100 to suppress undesirable oxidation reactions at the molten glass-metal interface by reducing, eliminating or reversing hydrogen permeation through the platinum-containing vessel wall. A controlled level of hydrogen permeation through the glass-metal interface into the molten glass reduces the production of undesirable species in molten glass 28 such as free oxygen, which in turn prevents the formation of undesirable gaseous inclusions in the molten glass. Hydrogen permeation into the molten glass-metal interface is achieved by supplying a higher partial pressure of hydrogen to the exterior surfaces (non-glass contact surfaces) in downstream glass manufacturing apparatus 30 relative to the interior molten glass-metal interfaces. To accomplish this, a humid, low oxygen atmosphere is maintained inside capsule 100.

An exemplary closed-loop control system 104 can include an environmental control system (ECS) 148 and a controller 150 that obtains sensor readings from one or more locations within capsule 100 and within piping systems leading to and from capsule 100 that circulate the capsule atmosphere. Controller 150 can obtain sensor readings from capsule supply sensors 152, capsule sensors 154 and capsule exit sensors 156. In this example, capsule supply sensors 152 can include a flow sensor 152a, a dew point or humidity sensor 152b, a temperature sensor 152c, an oxygen sensor 152d, and a pressure sensor 152e. Capsule sensors 154 can include a flow sensor 154a, a dew point or humidity sensor 154b, a temperature sensor 154c, an oxygen sensor 154d, and a pressure sensor 154e. Capsule exit sensors 156 can include a flow sensor 156a, a dew point or humidity sensor 156b, a temperature sensor 156c, an oxygen sensor 156d, and a pressure sensor 156e.

Controller 150 processes the sensor measurements and uses the resultant data to control different devices comprising ECS 148 such as humidity feed system 158, heating and/or cooling control system 160, air handler(s) 162 and 02 and/or $N_2$ makeup system 164. Air handler(s) 162 have access to air and water vapor (steam), e.g., through humidity feed system 158, that can be provided to capsule 100. All the devices 158, 160, 162 and 164 are in fluid communication with capsule 100 through a network of pipes 166. In operation, controller 150 controls devices 158, 160, 162 and 164 to create an atmosphere inside capsule 100 in which hydrogen generated by the decomposition of water vapor inside the capsule occurs at a rate equal to or greater than the rate of outward hydrogen permeation through the metal walls of vessels 32, 34, 36, 38, 40, 44 and 46 that would otherwise occur if an ambient atmosphere were present at the non-glass contact surfaces of the vessels. And, when there is a higher partial pressure of hydrogen at the outside surfaces of the vessels, the reduction of undesirable species such as oxygen within the molten glass 28 prevents the formation of undesirable gaseous inclusions therein.

Additionally, the separately controllable atmosphere within the capsule 100 can be used to greatly reduce the oxidation rate of the platinum-containing vessels 32, 34, 36, 38, 40, 44 and 46. Because the platinum-containing vessels of the downstream glass manufacturing apparatus are operated at high temperatures (in a range from about 1200° C. to about 1700° C., depending on location and function), the platinum-containing vessels may rapidly oxidize in the presence of a high oxygen concentration, for example the oxygen content typically found in breathable air. By placing the platinum-containing vessels of the downstream glass manufacturing apparatus within a separately controllable atmosphere, e.g., the capsule atmosphere, oxygen concentration can be kept reliably low, e.g., less than about 5% by volume, for example less than about 3% by volume, such as in a range from about 2% to about 0.5%.

As described above, the atmosphere within the capsule, a combination of water vapor and inert gas (e.g., nitrogen) serves several purposes: It provides control and mitigation of hydrogen permeation by regulating the partial pressure of hydrogen outside the platinum-containing vessels of the downstream glass manufacturing, and it prevents oxidation and disintegration of the platinum-containing vessels of the downstream glass manufacturing apparatus by limiting the concentration of oxygen in contact with these vessels. In addition, the capsule atmosphere serves as a cooling medium to aid in controlling a viscosity of the molten glass flowing within the platinum-containing vessels of the downstream glass manufacturing apparatus.

The manufacture of glass articles, for example glass sheets suitable for use in the manufacture of display panels, requires careful viscosity control of the molten glass. The molten glass within the fining vessel should be at a sufficiently low viscosity to allow bubbles to escape the molten glass, sufficiently hot to reduce the fining agent, and comprise a sufficiently low viscosity in the downstream mixing vessel even after radiative cooling to allow the stirring member to rotate and homogenize the molten glass. Yet the molten glass should have a viscosity sufficiently high at the forming body to allow the molten glass to assume a specific structure. To achieve this viscosity control, a combination of heating and cooling is performed by heating elements (including direct heating of selected vessels), insulation of various thermal conductivities, thicknesses, and layers placed around the platinum-containing vessels within the capsule, and the flow of capsule atmosphere.

The flow of capsule air around platinum-containing vessels 32, 34, 36, 38, 40, 44 and 46 positioned within capsule 100 draws heat away from the platinum-containing vessels, primarily via convection. Blowers in air handling unit 162 circulate the capsule atmosphere from ECS 148 through piping network 166 and through the capsule jacket volume 102, thus cooling the molten glass flowing through the platinum-containing vessels. Various temperature and humidity sensing devices within the capsule transmit temperature and humidity information from the various sensing devices 152, 154 and 156 to controller 150. Controller 150 in turn controls heaters and/or coolers to control the temperature and humidity (e.g., dew point) of the capsule atmosphere.

While the foregoing capsule apparatus is capable of controlling and mitigating hydrogen permeation, and largely avoiding oxidation of the platinum-containing vessels within the capsule, it is difficult to form a completely leak-free (e.g., gas-tight) containment structure. Moreover, the blowers within air handling system 162 can create low-pressure regions within capsule 100 (and piping network 166). These low-pressure regions can draw air (e.g., oxygen) outside the capsule into the capsule atmosphere through leaks, for example through leaking gaskets, insecure joints, etc. This infiltration of outside air into the capsule can raise the oxygen concentration within the capsule, thereby increasing a risk of oxidation of the platinum-containing vessels and reducing vessel lifetime.

Moreover, because of the high capital cost of the manufacturing apparatus, production increases are largely obtained by increasing molten glass flow rate. An increase in molten glass flow rate can lead to higher operating temperatures in the molten glass-carrying vessels. Higher operating temperature in turn may need to be limited by increasing cooling to maintain viscosity control, which can lead to higher blower speed, further decreasing the atmospheric pressure in the low-pressure regions of the capsule and increasing leakage of outside air (e.g., oxygen) into the capsule, thereby increasing the oxygen concentration. Consequently, the ability to increase production can be limited by the inability to reduce oxygen concentration in the capsule atmosphere.

In accordance with the present disclosure, a gas conditioning and injection apparatus (GCI) 200 is arranged in fluid communication with capsule 100, e.g., via piping network 166. GCI 200 may, for example, form part of ECS 148. In various embodiments, GCI 200 comprises a reaction chamber 202 in fluid communication with piping network 166 downstream of at least air handling system 162, and a gas injection valve 204 fluidly coupled to piping network 166 upstream of reaction chamber 202 and configured to inject a reaction gas 206 comprising hydrogen into circulation path 208. That is, gas injection valve 204 can be positioned between air handling system 162 and reaction chamber 202 and in fluid communication with each, although in further embodiments, gas injection valve 204 can be configured to inject reaction gas 206 directly into reaction chamber 202. Capsule 100, piping network 166 (including upstream and downstream piping 166a, 166b, respectively and relative to reaction chamber 202), ECS 148, and reaction chamber 202 form a circulation path 208. Oxygen sensors can be positioned upstream (e.g., sensor 156d), and/or downstream (e.g., sensor 152d) of reaction chamber 202 to measure a concentration of oxygen flowing into reaction chamber 202 and a concentration of oxygen flowing out of the reaction chamber. Gas injection valve 204 may be a gas mixing valve, wherein two or more gases are received from individual gas sources and mixed at the valve, or the gas injection valve may be a valve configured to receive a single gas.

Reaction gas 206 comprises hydrogen. In some embodiments, reaction gas 206 can further comprise an inert gas, for example nitrogen or any one or more of the noble gases (e.g., helium, neon, argon, krypton, xenon), or combinations thereof. Reaction gas 206 can comprise hydrogen in an amount from about 1% to 100% by volume relative to a total volume of the reaction gas, for example in a range from about 2% to about 90% by volume, in a range from about 4% to about 80% by volume, or in a range from about 5% to about 70% by volume, including all ranges and subranges therebetween, with the remainder comprising an inert gas. For example, gas injection valve 204 can be configured to introduce hydrogen into the capsule atmosphere between capsule 100 and reaction chamber 202 through piping network 166 at a non-explosive concentration by mixing the hydrogen with a suitable concentration of inert gas. For example, reaction gas 206 can, in some embodiments, be commercially available forming gas with a hydrogen concentration of about 5% by volume and 95% nitrogen by volume.

Figure 2:
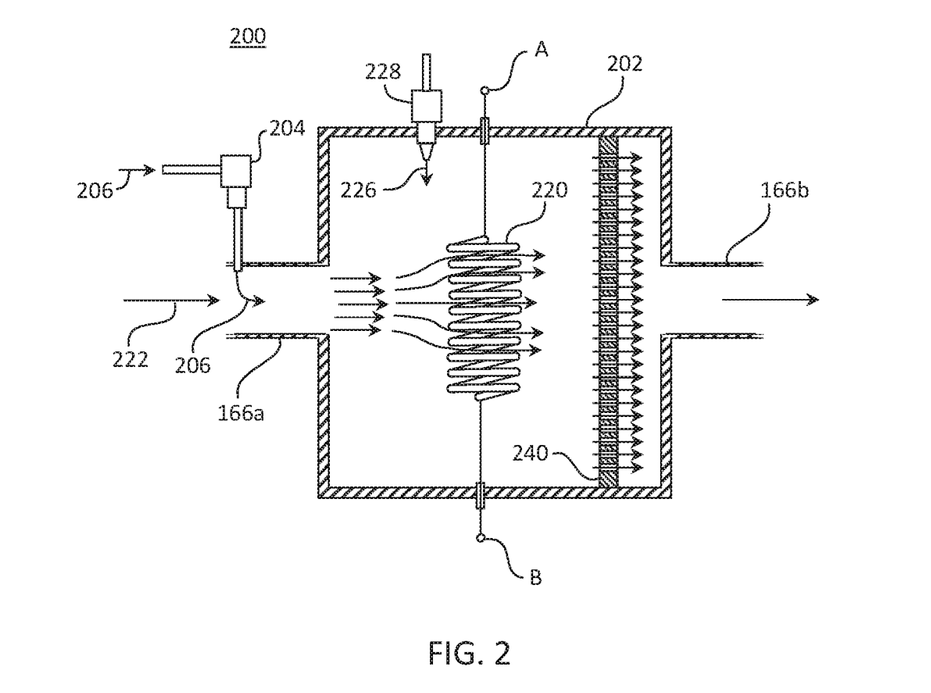
FIG. 2 is a cross sectional view of an exemplary reaction chamber.

FIG. 2 is a cross sectional side view of an exemplary reaction chamber 202. In some embodiments, reaction chamber 202 comprises at least one electrical resistance heating element 220. Heating element 220 may be a nickel-chromium based alloy, for example, an Inconel® heating element (e.g., Inconel 800), although other materials may be used, e.g., platinum or a platinum alloy. As reaction gas 206 is injected via gas injection valve 204 into upstream piping 166a connecting reaction chamber 202 to capsule 100, reaction gas 206 mixes with the oxygen-containing capsule atmosphere 222 flowing into reaction chamber 202. Electrical power is supplied to heating element 220 from an electrical power source (not shown), for example through leads A and B, which heats reaction gas 206 and capsule atmosphere 222 within reaction chamber 202 to a temperature equal to or greater than a temperature at which the hydrogen gas contained within reaction gas 206 combines with oxygen in the capsule atmosphere. For example, in some embodiments, the heating element temperature can be equal to or greater than about 500° C., for example in a range from about 500° C. to about 600° C.

In some embodiments, a flow of oxygen 226 may be provided directly into the reaction chamber or into upstream piping 166a, e.g., via gas injection valve 228, to provide sufficient oxygen to ensure the injected hydrogen is completely reacted. That is, in some instances the amount of injected hydrogen may be sufficiently small that the amount of hydrogen is difficult to accurately control. In such instances, more than the amount of hydrogen needed to react with the oxygen already present in the capsule atmosphere may be injected through gas injection valve 204 (an amount of hydrogen easier to control via gas injection valve 204), in which instance additional oxygen can be added to reaction chamber 202 via gas injection valve 228 to react with the excess added hydrogen and avoid, for example, a buildup of flammable or explosive concentrations of hydrogen in the system. The injected oxygen can be, for example, in the form of air, wherein air is injected into reaction chamber 202.

GCI 200 may further include a controller configured to control one or more of the flow of reaction gas to circulation path 208 (e.g., upstream piping 166a), the flow of oxygen to reaction chamber 202 from outside capsule 100, and air flow through the reaction chamber. That is, in some embodiments, gas injection valve 204 and/or gas injection valve 228 can be remotely operated. In some embodiments, this function may be handled via controller 150, although in further embodiments an additional controller can be used.

In some embodiments, reaction chamber 202 may be provided with a catalyst, for example platinum, wherein oxygen in the capsule atmosphere and the injected hydrogen gas reacts with the catalyst to produce water. For example, reaction chamber 202 can include a high surface area body 240, such as a ceramic honeycomb plate, one or more baffles, or other high surface area structures, coated with the catalyst.

The catalyst can be used in conjunction with the heating element 220, or depending on the temperature of capsule atmosphere 222 entering reaction chamber 202, without heating element 220, although in further embodiments, the at least one heating element 220 can be present but turned off, or cycled on and off. In accordance with some embodiments, the at least one heating element 220 can be a platinum or platinum alloy heating element that both heats reaction gas 206 and the capsule atmosphere 222 and further functions as a catalyst to facilitate the hydrogen-oxygen reaction.

Example

A reaction chamber was prepared with an inlet and an outlet and a blower fan to move at atmosphere through the reaction chamber. To achieve baseline data, 100% $N_2$ was flowed into the inlet of the reaction chamber with an injection valve at 850 standard liters per minute (slpm) and 103.4 kiloPascals (kPa) until a steady state condition was achieved within the enclosure. The steady state condition was 2.82% O2, 505° C. heater element temperature, 37° C. atmospheric temperature. The blower fan set at a 10 Hz power supply frequency. Dew point was not monitored or controlled.

Immediately after achieving the baseline condition, the injected gas was switched over to a 5% forming gas (5% hydrogen and 95% nitrogen). The flowing conditions were achieved: Sensed oxygen was ~0% (a Novetech $O_2$ sensor reading was $2.92 \times 10^{-16}$% $O_2$), 508° C. heater element temperature, 44° C. air temperature, 793 slpm forming gas at 103.4 kPa, Blower fan set at 10 Hz. Dew point was not monitored or controlled.

The data show that introducing hydrogen gas into a heated reaction chamber with an oxygen-containing gas can reduce an oxygen concentration flowing into a reaction chamber to a level significantly less than 0.5% by volume, even less than 0.1% by volume flowing out of the reaction chamber. In accordance with embodiments disclosed herein, an inflowing oxygen concentration equal to or greater than about 2% by volume, for example in a range from about 2% to about 3% by volume, can be reduced to an outflowing oxygen concentration equal to or less than about 0.2% by volume, for example equal to or less than about 0.1%, for example equal to or less than 0.05%, for example equal to or less than about 0.005%, such as equal to or less than about 0.001%.

It will be apparent to those skilled in the art that various modifications and variations can be made to embodiments of the present disclosure without departing from the scope of the disclosure. Thus, it is intended that the present disclosure cover such modifications and variations provided they come within the scope of the appended claims and their equivalents.

What is claimed is:

1. A method of reducing an oxygen concentration in an atmosphere contained in an enclosure of a glass manufacturing apparatus, comprising:
    flowing molten glass through a platinum-containing vessel positioned within the enclosure;
    flowing the atmosphere through an enclosed volume between the enclosure and the platinum-containing vessel;
    directing the atmosphere through a reaction chamber in fluid communication with the enclosed volume, wherein the reaction chamber comprises at least a first wall and a second wall, the reaction chamber receives the atmosphere from the enclosure through a first orifice in the first wall, and the atmosphere flows to the enclosure through a second orifice in the second wall;
    injecting a reaction gas comprising hydrogen gas into the atmosphere;
    heating the atmosphere in the reaction chamber with a heating element; and
    reacting the hydrogen gas with oxygen from the atmosphere in the reaction chamber,
    wherein the atmosphere is in fluid communication with an environmental control system.

2. The method according to claim 1, wherein a concentration of hydrogen gas in the reaction gas is in a range from about 1% to 100% by volume relative to a total volume of the reaction gas.

3. The method according to claim 2, wherein the reaction gas comprises an inert gas.

4. The method according to claim 1, wherein the atmosphere flows between the enclosed volume and the reaction chamber along a circulation path, and the reaction gas is injected into the circulation path upstream of the reaction chamber.

5. The method according to claim 4, further comprising sensing a concentration of oxygen in the circulation path upstream of the reaction chamber.

6. The method according to claim 5, wherein the oxygen concentration in the circulation path upstream of the reaction chamber is equal to or greater than about 0.5% by volume.

7. The method according to claim 4, further comprising sensing a concentration of oxygen in the circulation path downstream of the reaction chamber.

8. The method according to claim 7, wherein the oxygen concentration in the circulation path downstream of the reaction chamber is less than about 0.2% by volume.

9. The method according to claim 7, further comprising injecting additional oxygen into the reaction chamber during the reacting.

10. The method according to claim 1, wherein a pressure of the atmosphere in the enclosure is less than about 38 Pa.

11. The method according to claim 1, wherein the heating element comprises an electrical resistance heating element.

12. The method according to claim 1, wherein a temperature of the heating element is equal to or greater than about 500° C.

13. The method according to claim 1, wherein the environmental control system comprises a humidity feed system, a heating or cooling control system, an air handler, an $O_2/N_2$ makeup system, or combinations thereof.

14. A method of reducing an oxygen concentration in an atmosphere contained in an enclosure of a glass manufacturing apparatus, comprising:
    flowing molten glass through a platinum-containing vessel positioned within the enclosure containing the atmosphere, the atmosphere flowing through an enclosed volume between the enclosure and the platinum-containing vessel;
    directing the atmosphere through a reaction chamber in fluid communication with the enclosed volume through piping upstream of the reaction chamber and piping downstream of the reaction chamber, wherein the enclosed volume, the upstream piping, the reaction chamber, and the downstream piping comprise a circulation path;
    injecting hydrogen gas into the circulation path upstream of the reaction chamber;
    heating the atmosphere and the hydrogen gas in the reaction chamber with a heating element; and
    reacting the hydrogen gas with oxygen from the atmosphere in the reaction chamber, wherein the reacting comprises exposing the hydrogen gas and the oxygen to a platinum-containing catalyst in the reaction chamber.

15. The method according to claim 1, wherein the injecting further comprises injecting an inert gas with the hydrogen gas.

16. The method according to claim 1, further comprising injecting additional oxygen into the reaction chamber.

17. The method according to claim 1, wherein the heating element comprises an electrical resistance heating element.

18. The method according to claim 1, wherein a temperature of the heating element is equal to or greater than about 500° C.

19. The method according to claim 1, wherein the reaction chamber further comprises a ceramic honeycomb plate coated with the platinum-containing catalyst.

20. An apparatus for controlling an oxygen containing atmosphere in a glass manufacturing process, comprising:
    a platinum-containing vessel configured to convey a molten material therethrough;
    an enclosure defining an enclosed volume and containing the platinum-containing vessel;
    an environmental control system in fluid communication with the enclosed volume and configured to circulate an atmosphere through the enclosed volume;
    a reaction chamber comprising at least a first wall and a second wall, the reaction chamber configured to receive the atmosphere from the enclosure through a first orifice in the first wall and flow the atmosphere flows to the enclosure through a second orifice in the second wall;
    a first gas injection valve in fluid communication with a reservoir of hydrogen gas and configured to provide the hydrogen gas to the reaction chamber from a location upstream of the reaction chamber relative to a flow direction of the atmosphere; and
    a heating element positioned in the reaction chamber.

21. The apparatus according to claim 20, further comprising a platinum containing catalyst positioned within the reaction chamber.

22. The apparatus according to claim 20, wherein the heating element comprises platinum.

23. The apparatus according to claim 20, further a second gas injection valve in fluid communication with a reservoir of an oxygen-comprising gas and configured to provide the oxygen-comprising gas to the reaction chamber.

24. The apparatus according to claim 21, wherein the platinum-containing catalyst is coated on a ceramic honeycomb plate.

25. The apparatus according to claim 20, wherein the environmental control system comprises a humidity feed system, a heating or cooling control system, an air handler, an $O_2/N_2$ makeup system, or combinations thereof.

* * * * *

UNITED STATES PATENT AND TRADEMARK OFFICE
CERTIFICATE OF CORRECTION

| | |
|---|---|
| PATENT NO. | : 11,760,678 B2 |
| APPLICATION NO. | : 17/048852 |
| DATED | : September 19, 2023 |
| INVENTOR(S) | : Michael James Buchholz et al. |

It is certified that error appears in the above-identified patent and that said Letters Patent is hereby corrected as shown below:

In the Claims

In Column 16, Line 34, in Claim 15, delete "claim 1," and insert -- claim 14, --.

In Column 16, Line 37, in Claim 16, delete "claim 1," and insert -- claim 14, --.

In Column 16, Line 39, in Claim 17, delete "claim 1," and insert -- claim 14, --.

In Column 16, Line 41, in Claim 18, delete "claim 1," and insert -- claim 14, --.

In Column 16, Line 44, in Claim 19, delete "claim 1," and insert -- claim 14, --.

In Column 17, Line 2, in Claim 21, delete "platinum containing" and insert -- platinum-containing --.

Signed and Sealed this
Twentieth Day of February, 2024

Katherine Kelly Vidal
*Director of the United States Patent and Trademark Office*